US012157592B2

(12) United States Patent
Lindblad et al.

(10) Patent No.: US 12,157,592 B2
(45) Date of Patent: Dec. 3, 2024

(54) PARTICLE REMOVAL DEVICE FOR A FILLING MACHINE

(71) Applicant: TETRA LAVAL HOLDINGS & FINANCE S.A., Pully (CH)

(72) Inventors: Jenny Lindblad, Bjärred (SE); Aurelia Vallier, Sjöbo (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 237 days.

(21) Appl. No.: 17/766,042

(22) PCT Filed: Sep. 30, 2020

(86) PCT No.: PCT/EP2020/077311

§ 371 (c)(1),
(2) Date: Apr. 1, 2022

(87) PCT Pub. No.: WO2021/063991

PCT Pub. Date: Apr. 8, 2021

(65) Prior Publication Data

US 2022/0380078 A1 Dec. 1, 2022

(30) Foreign Application Priority Data

Oct. 4, 2019 (EP) .................................... 19201526

(51) Int. Cl.
*B65B 55/24* (2006.01)
*B08B 9/28* (2006.01)
(Continued)

(52) U.S. Cl.
CPC .............. *B65B 55/24* (2013.01); *B08B 9/283* (2013.01); *B08B 13/00* (2013.01); *B08B 15/02* (2013.01);
(Continued)

(58) Field of Classification Search
CPC ......... B65B 55/24; B08B 13/00; B08B 15/02; B08B 15/04
See application file for complete search history.

(56) References Cited

U.S. PATENT DOCUMENTS 2,620,961 A * 12/1952 Wahl ....................... B65B 43/39 15/309.2
3,649,993 A * 3/1972 Sauer ....................... B65B 43/39 15/309.2
(Continued)

FOREIGN PATENT DOCUMENTS

GB 724965 A * 2/1955
JP S57104593 A 6/1982
(Continued)

OTHER PUBLICATIONS

Translation of KR20110002455.*
(Continued)

*Primary Examiner* — Lucas E. A. Palmer
(74) *Attorney, Agent, or Firm* — BUCHANAN INGERSOLL & ROONEY PC

(57) ABSTRACT

A particle removal device for a filling machine configured to form, fill, and seal individual packages is provided. The particle removal device comprises an air supply pipe, and a controller being programmed to activate the particle removal device such that a jet of air is directed into a ready-to-fill package passing the particle removal device.

17 Claims, 4 Drawing Sheets

(51) Int. Cl.

| | |
|---|---|
| ***B08B 13/00*** | (2006.01) |
| ***B08B 15/02*** | (2006.01) |
| ***B08B 15/04*** | (2006.01) |
| ***B65B 3/02*** | (2006.01) |
| ***B65B 57/02*** | (2006.01) |

(52) U.S. Cl.
CPC .............. *B08B 15/04* (2013.01); *B65B 3/025* (2013.01); *B65B 3/027* (2013.01); *B65B 57/02* (2013.01); *B08B 2209/08* (2013.01)

(56) References Cited

U.S. PATENT DOCUMENTS

| | | | | | |
|---|---|---|---|---|---|
| 3,677,273 | A * | 7/1972 | Mahlstede | B08B 9/30 | 198/402 |
| 3,723,060 | A * | 3/1973 | Lisiecki | B65B 55/10 | 422/302 |
| 4,667,690 | A * | 5/1987 | Hartnig | B08B 9/30 | 134/144 |
| 5,129,212 | A * | 7/1992 | Duffey | B65B 55/022 | 141/10 |
| 5,159,960 | A * | 11/1992 | Pringle | B65G 15/00 | 141/169 |
| 5,279,017 | A * | 1/1994 | Foreshew | B08B 5/02 | 15/345 |
| 5,447,016 | A * | 9/1995 | Ueda | B01D 19/02 | 53/565 |
| 5,881,429 | A * | 3/1999 | Drewitz | B08B 9/286 | 15/345 |
| 6,056,918 | A * | 5/2000 | Palaniappan | B65B 55/10 | 53/565 |
| 6,120,730 | A * | 9/2000 | Palaniappan | B65B 55/10 | 53/167 |
| 6,162,156 | A * | 12/2000 | Fujikawa | B65B 3/025 | 15/309.2 |
| 6,761,191 | B2 * | 7/2004 | Rosen | B67C 3/005 | 141/144 |
| 7,111,440 | B2 * | 9/2006 | Anderson | B65B 31/042 | 53/433 |
| 2003/0115710 | A1 * | 6/2003 | Choi | B08B 9/283 | 15/309.2 |
| 2009/0101178 | A1 * | 4/2009 | Wu | B08B 9/34 | 134/92 |
| 2011/0100401 | A1 * | 5/2011 | Fiorentini | B08B 6/00 | 134/22.12 |
| 2012/0085370 | A1 * | 4/2012 | Auer | B65B 55/10 | 134/61 |
| 2012/0247512 | A1 * | 10/2012 | Wu | B08B 9/286 | 137/15.01 |
| 2014/0311095 | A1 * | 10/2014 | Hayakawa | A61L 2/208 | 53/167 |
| 2014/0331607 | A1 * | 11/2014 | Yamada | B67C 7/004 | 53/510 |
| 2018/0243058 | A1 * | 8/2018 | Bouchot | B05C 3/04 | |
| 2019/0016493 | A1 * | 1/2019 | Flörke | B65B 3/04 | |
| 2022/0380078 | A1 * | 12/2022 | Lindblad | B08B 15/04 | |
| 2023/0356271 | A1 * | 11/2023 | Ogawa | B65B 55/10 | |

FOREIGN PATENT DOCUMENTS

| | | | | | |
|---|---|---|---|---|---|
| JP | H0285102 | A | | 3/1990 | |
| JP | 2004026204 | A | * | 1/2004 | |
| JP | 2004359253 | A | * | 12/2004 | |
| KR | 20110002455 | U | * | 3/2011 | |
| WO | WO-2013138231 | A1 | * | 9/2013 | B08B 1/04 |

OTHER PUBLICATIONS

International Search Report (PCT/ISA/210) and Written Opinion (PCT/ISA/237) mailed on Dec. 11, 2020, by the European Patent Office as the International Searching Authority for International Application No. PCT/EP2020/077311.

* cited by examiner

PARTICLE REMOVAL DEVICE FOR A FILLING MACHINE

TECHNICAL FIELD

The invention relates to a filling machine, in particular to a particle removal device of a filling machine being configured to form, fill, and seal individual packages. The present invention also relates to a method for removal of particles of packages during production, i.e. during package forming and filling.

BACKGROUND ART

Within the food industry, beverages and other products are often packed in paper or paperboard based packages. Packages intended for liquid food are often produced from a packaging laminate comprising a core layer of paper or paperboard and an outer, liquid-tight layer of thermoplastic material on at least that side of the core layer which will form the inside of the packages.

One group of frequently occurring packages are so-called ready-to-fill packages. Such a ready-to-fill package is provided as a sleeve of packaging laminate like the one described above, being sealed at its bottom end prior to filling. The upper end may either be formed by sealing and forming the upper end of the sleeve, or by adding an upper part in the form of e.g. a plastic top; the upper end/part may be provided with an opening/closing means, such as a screw cap.

The open-ended packaging material sleeve is received at an infeed station of the filling machine, whereafter the bottom end is formed and sealed; the semi-finished package is at this point ready to fill. At a downstream station, the ready-to-fill packages are sterilized or disinfected at least on the inside in order to extend the shelf-life of the product to be stored in the packages. Depending on the desired shelf-life length and depending on whether the packages are to be distributed and stored in a refrigerated environment or at room temperature, different levels of sterilization/disinfection may be obtained.

After sterilization the packages are further transported to a filling zone for product filling, a sealing zone for sealing of the open end, and typically also to a final forming zone for final forming of the package.

Especially for liquid food packaging it is important to produce packages with a minimum of unwanted particles. These particles are disadvantageous for a number of reasons. For example, large particles may affect the quality of the enclosed product in a negative manner. Large particles may also affect filling machine performance negatively, such as sealing operations. Furthermore, particles of any size may carry living organisms which are unwanted due to hygienic issues. In addition to the above-mentioned drawbacks, the presence of particles may also cause combustion if hydrogen peroxide is used as disinfection medium. Hence there is a need for a filling machine providing for improved removal of particles from ready-to-fill packages.

SUMMARY

It is an object of the invention to at least partly overcome one or more of the above-identified limitations of the prior art. In particular, it is an object to provide a particle removal device for a filling machine which is capable of removing particles from ready-to-fill packages. As particles may be produced during the operation of producing the ready-to-fill package, it is advantageous to arrange a particle removal device in the filling machine close to where the particles are generated.

To solve these objects a particle removal device is provided. The particle removal device is to be used with a filling machine configured to form, fill, and seal individual packages. The particle removal device comprises an air supply pipe, and a controller being programmed to activate the particle removal device such that a jet of air is directed into a ready-to-fill package passing the particle removal device.

The controller may be programmed to control activation of the particle removal device based on the motion of ready-to-fill packages passing the particle removal device.

The controller may be programmed to control activation of the particle removal device for an entire indexing cycle, during which two consecutive ready-to-fill packages are passing the particle removal device.

In an embodiment, the jet of air is constant during activation of the particle removal device.

Activation of the particle removal device may be started when a leading sidewall of a ready-to-fill package is positioned in the same vertical plane as an orifice of the air supply pipe.

The particle removal device may further comprise a hood, and the air supply pipe may be arranged inside said hood. The hood may be provided with an air evacuation unit. An orifice of the air supply pipe may be arranged vertically below the bottom end of the hood.

The hood may be dimensioned to cover at least one ready-to-fill package.

According to a second aspect, a filling machine is provided comprising a particle removal device according to the first aspect.

The filling machine may further comprise a cap applicator station, wherein the particle removal device is arranged downstream the cap applicator station.

The filling machine may further comprise a disinfection station, wherein the particle removal device is arranged upstream the disinfection station.

According to a third aspect, a method for a filling machine configured to form, fill, and seal individual packages is provided. The method comprises a first step of providing a particle removal device in accordance with the first aspect, and a step of activating said particle removal device such that a jet of air is directed into a ready-to-fill package passing the particle removal device.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
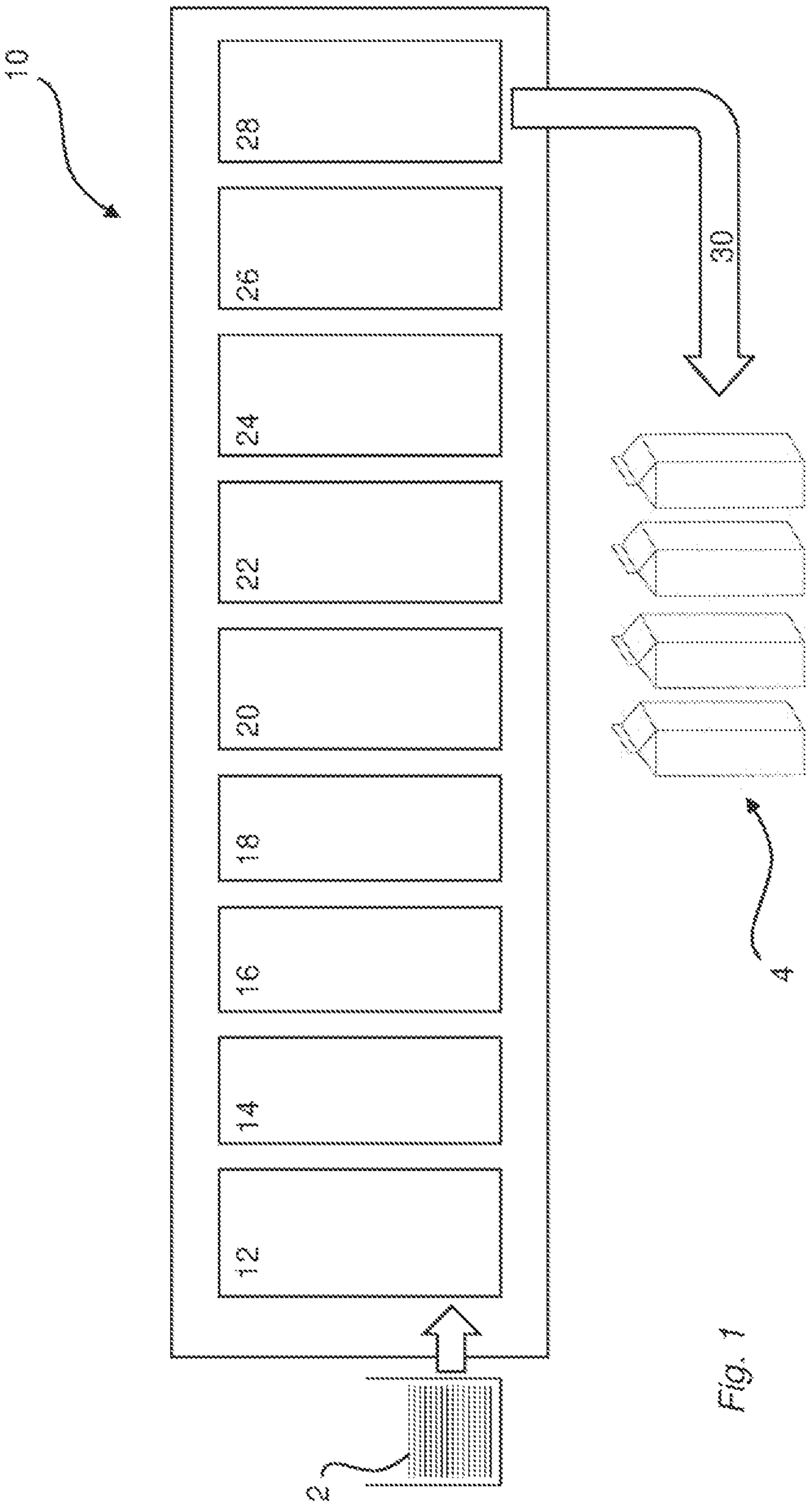
FIG. 1 is a schematic view of a filling machine according to an embodiment.

With reference to FIG. 1 a filling machine 10 is shown schematically. The filling machine 10, being configured to form, fill, and seal packages 4, has an infeed station 12 in which blanks 2 of packaging material are received. The blanks 2 are typically produced as sleeves of a carton-based packaging material, as is well known in the art and already described briefly in the background section. The infeed station 12 is arranged upstream a bottom sealing station 14, in which the blanks 2 are erected to a sleeve-shape, and in which station the bottom end of each blank is sealed to form a semi-finished package having one bottom end being closed, while the upper end is still open.

Upstream or downstream the bottom sealing station 14, a cap applicator station 16 may be provided. The purpose of the cap applicator station 16 is to attach an opening device to the sleeve-shaped blanks 2, such as a screw cap with an associated neck. Typically, the neck and cap is provided as a pre-manufactured assembly, and attachment to the sleeve-shaped blank is done by ultrasonic sealing.

Immediately downstream the cap applicator station 16, a particle removal device 18 is arranged. The particle removal device 18 is configured to remove unwanted particles from the sleeve-shaped blanks prior to disinfection.

After passing the particle removal device 18, the semi-finished packages are transported to a disinfection station 20, in which the amount of living micro-organisms is reduced. The level of disinfection may vary depending on user objectives. Disinfection of the packaging material may e.g. be accomplished by means of treatment with hydrogen peroxide, UV light, electron beam radiation, etc.

Downstream the disinfection station 20 a filling station 22 is arranged. Here, the ready-to-fill packages are filled with their desired content. After filling, the packages may be transported to a pre-folding station 24 in which the upper part of the open-ended package is formed to a desired shape. After pre-forming the packages are transported to a heating station 26 in which heat-sealable material of the packaging material is heated to an elevated temperature. The elevated temperature of the upper end of the packages facilitates sealing of the upper end when the packages enter the sealing station 28 arranged immediately after the heating station 26.

Once sealed, the packages 4 are discharged by means of an outfeed station 30.

It should be mentioned that the filling machine 10 may not be constructed exactly as described with reference to FIG. 1, but the filling machine 10 may also be configured to produce other type of packages, such as plastic top packages, etc.

Figure 2:
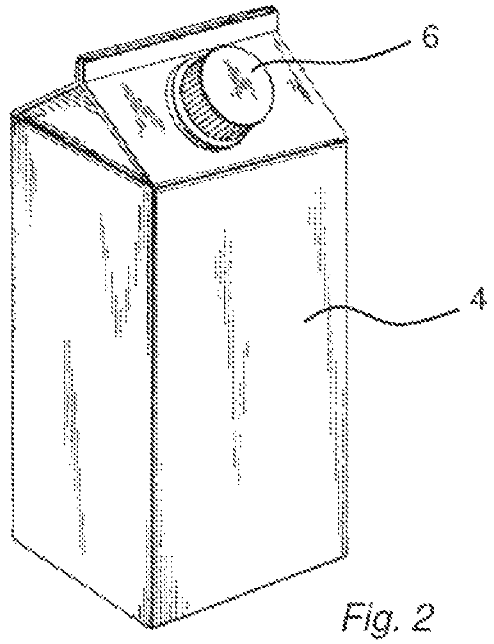
FIG. 2 is an isometric view of a package being produced by the filling machine shown in FIG. 1.

In FIG. 2 an example of a package 4 being produced by a filling machine 10 is shown. The package 4 is of a so called gable-top package, having a screw cap 6 attached to it. The screw cap 6 may be attached to the package 4 using a screw cap applicator station 16 as further described below.

Figure 3:
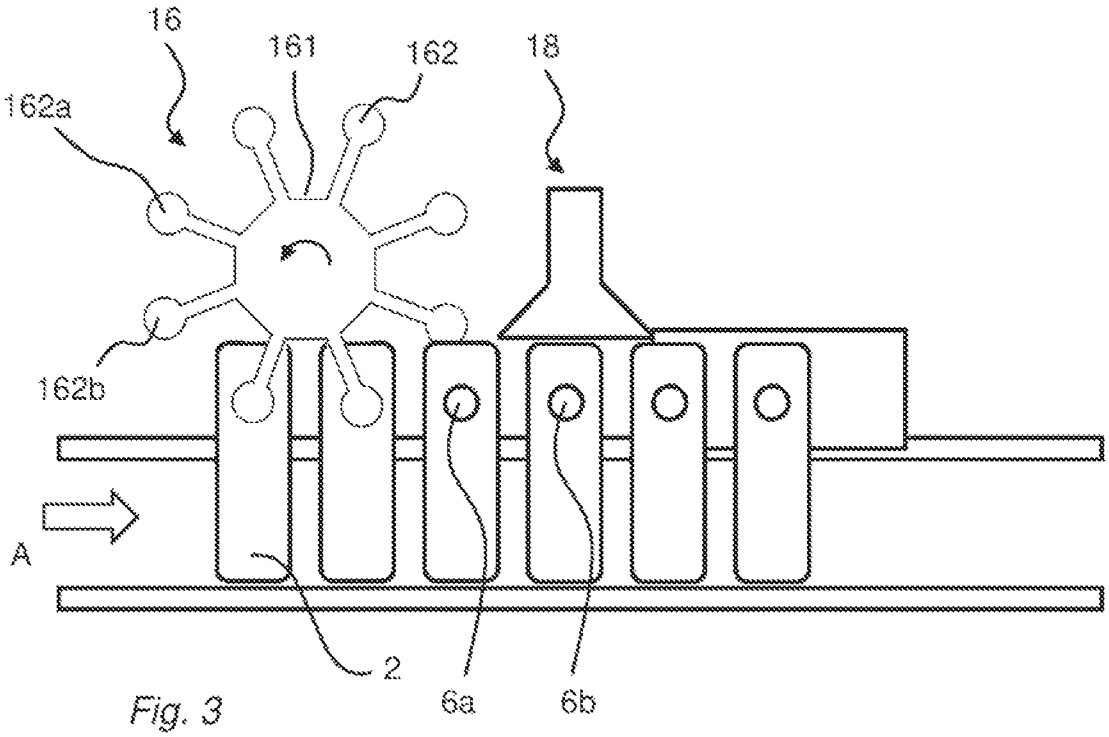
FIG. 3 is a schematic view of parts of a filling machine, comprising a particle removal device according to an embodiment.

Specific parts of the filling machine 10 are further shown in FIG. 3. The sleeve-shaped blanks 2 are being transported through the cap applicator station 16 in the direction A, as indicated by the block arrow. The cap applicator station 16 may comprise an index carousel 161 carrying an even number of cap application units 162 extending radially outwards as spokes. In the shown example, eight cap application units 162 are present although other numbers are possible.

The index carousel 161 is not rotating continuously, but it has four distinct activation positions; for each activation position, two adjacent cap application units 162 are positioned close to respective blanks 2, whereby these two blanks 2 will be provided with their respective cap 6 at the same time. One of the four activation positions is shown in FIG. 3.

The motion sequence of the index carousel 161 also requires the flow of blanks 2 to be controlled in a similar manner; the blanks 2 will be stationary positioned in relation to the active cap application units 162, whereafter the blanks 2 will move forward until the next two blanks 2 are positioned correctly relatively the next active cap application units 162.

In FIG. 3, it can be seen that caps 6*a* and 6*b* have been attached using cap application units 162*a* and 162*b*, respectively.

Immediately downstream the cap applicator station 16 the particle removal device 18 is arranged. The particle removal device 18 is configured to remove unwanted particles from the ready-to-fill packages leaving the cap applicator station 16.

Figure 4:
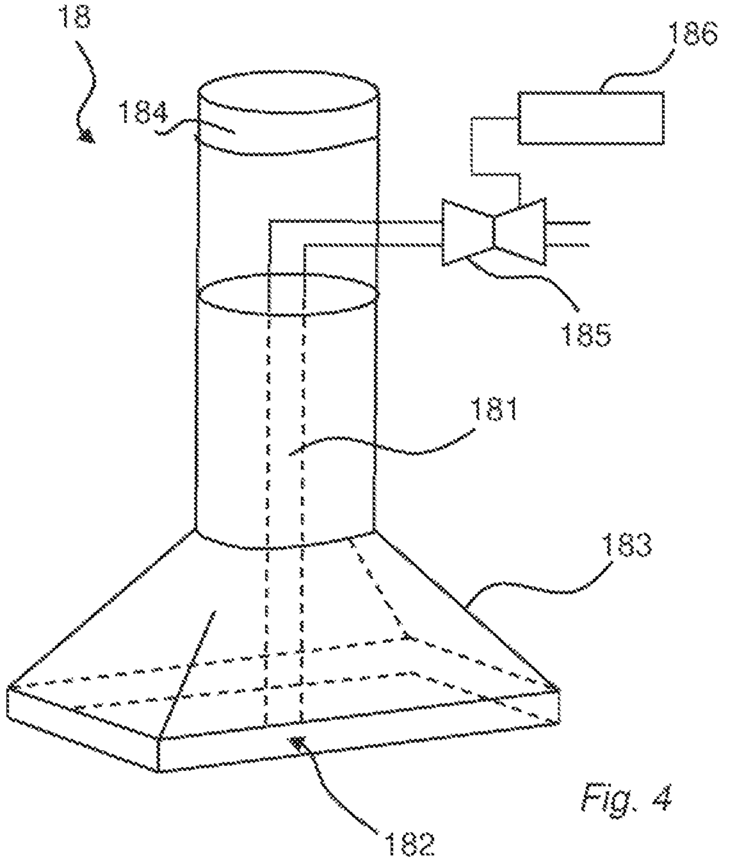
FIG. 4 is an isometric view of a particle removal device according to an embodiment.

Now turning to FIG. 4, the particle removal device 18 is shown in further details. The particle removal device 18 is operating by providing a flow of air, preferably clean air, into the ready-to-fill packages or sleeve-shaped blanks 2. For this, the particle removal device 18 comprises an air supply pipe 181 extending essentially in a vertical direction, and having an orifice 182 at its end in order to allow air to flow into the packages. The orifice 182 may be a single orifice, or a series of orifices. Each orifice may have a circular shape, rectangular shape, or any other suitable shape.

The air supply pipe 181, as well as its orifice 182, is arranged in a hood 183 which is dimensioned to cover at least one of the ready-to-fill packages when the particle removal device 18 is activated. The hood 183 is further in fluid communication with an air evacuation unit 184, for allowing air to be drawn out through the hood 183. The evacuation unit 184 may be activated all the time, or it may be controlled such that evacuation of air is only performed when the particle removal device 18 is activated. The hood 183 may be directed substantially vertical upwards, but it may also be bent e.g. by forming an L-shape, in order to avoid evacuated particles to fall down into the packages immediately below the hood 183.

The air supply pipe 181 is connected to a valve 185, which in turn is controlled by means of a controller 186. The controller 186 is programmed to provide control signals to the valve 185 such that the supply of air through the air supply pipe 181 is controlled accordingly. The air supply pipe 181 can be extending vertically upwards, or it may be bent e.g. by forming an L-shape; preferably, a bent air supply pipe 181 can be used with a straight evacuation pipe from the hood 183, while a straight air supply pipe 181 can be used with a bent evacuation pipe from the hood 183.

Figure 5:
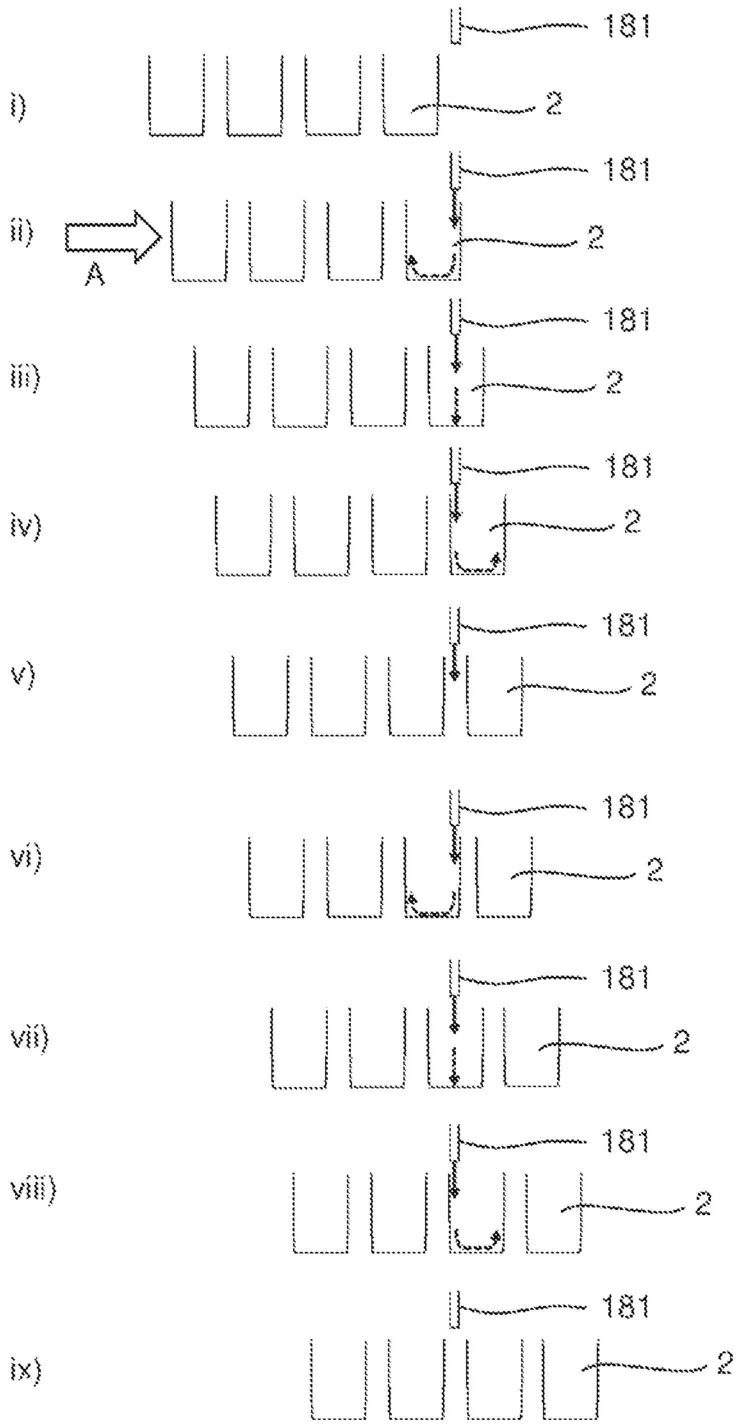
FIG. 5 is a graph showing operation of a particle removal device schematically.

Now turning to FIG. 5 operation of the particle removal device 18 is schematically shown. The different stages i)-ix) represent different positions of the stream of ready-to-fill packages or sleeve-shaped blanks 2 passing by the stationary particle removal device 18, here only shown as the air supply pipe 181.

At i), the packages are stationary due to an ongoing capping process upstream (not shown). At this point, the particle removal device 18 is in a non-active state, meaning that there is no air flowing out from the air supply pipe 181. The evacuation unit 184 may however still be active.

At ii) the packages are moving in the direction of the arrow A, away from the cap applicator station 16 and towards the disinfection station 20. When a package is aligned with the orifice 182 of the air supply pipe 181, such that the leading sidewall of the package is arranged in the same vertical plane as the orifice 182, the particle removal device 18 is activated by means of the controller 186, such that the valve 185 is opened allowing pressurized air to flow out from the orifice 182. As the orifice 182 is arranged only at a very small distance from the upper end of the packages, such as in the range of 1-35 mm, an efficient jet will be formed, propagating far down into the package without being negatively impacted by the evacuation flow. The jet will 'attach' to the inner side of the sidewall of the package, whereby the jet follows the inner side of the package to the other sides of the packages, thereby efficiently removing the particles from the walls as well as from the bulk of the package.

As the packages keep moving forward, as indicated at iii), the air supply will be directed essentially straight into the package until the trailing sidewall of the leading package is aligned with the orifice 182, as indicated at iv). At this point the jet will attach to the trailing sidewall, causing an efficient spread of the supplied air across the entire inner sides of the package. At v) the leading package is cleaned, whereby the orifice 182 is aligned in the small space between two adjacent packages. Although the particle removal device 18 is still active, i.e. air is still being supplied out from the orifice, no particle removal is actually taking place until the subsequent package is aligned with the orifice 182, indicated at vi). Steps vi)-ix) are identical to steps ii)-v) in terms of the particle removal operation, however at ix) the packages are stopped and kept stationary for the capping operation to take place upstream the particle removal device. At this point, the operation of the particle removal device 18 is changed to a non-active state by shutting off the supply of air. During steps ii)-ix), the motion of the packages is continuous in the direction A.

As has been described above, the technical concept is based on utilizing the movement of the package/blank 2 in relation to a pulsing air-jet to remove the particles from the ready-to-fill packages or blanks 2 and to capture them by a controlled evacuation flow from the evacuation unit 184 of the hood.

The air supply pipe 181 is preferably a single inlet pipe, extended down to a short distance from the upper package edge to have an efficient jet propagating far down into the package or blank 2 without being negatively impacted by the evacuation flow.

A single pulse of pressurized air covers both packages or blanks 2 in an indexing pair as they pass by the orifice 182. In this way the movement of the package or blank 2 will secure wall attachment of the jet first to one side of the package wall and then to the other side of the package wall, and thereby efficiently removing the particles from the walls as well as from the bulk of the package. The placement, timing and length of the pulse is controlled to secure wall attachment on both package sides and on both packages still considering the air consumption. Preferably, the air pulse is started just as the leading package edge enters below the inlet pipe and the air pulse is ended once process is completed on the second/trailing package of the indexing pair, at ix) in FIG. 5. Alternatively, the particle removal device 18 may be constantly activated such that air is constantly emitted out from the air supply pipe 181, even when the packages are stationary.

The particles exiting the package opening will be efficiently captured by the evacuation hood placed above, preferably with a central evacuation pipe operating at a controlled steady-state flow. As the air supply pipe 181 is extended down and thus being vertically below and separated from the evacuation point, the air jet will not be negatively affected by the evacuation flow, which still is able to capture the particles removed from the package. In this way the dust build-up in the machine is minimized. The control of the process may be based on the design of the hood with the integrated air supply pipe 181, the positioning of the air supply pipe 181 in relation to the package, the indexing motion profile, the timing of the pulse controlled by the valve 185, the flow of pressurized air (preferably controlled by pressure) and the evacuation flow. A controlled flow of air during the entire pulse can preferably be secured by pressure control provided that there is a sufficient accumulation volume before the valve 185.

The solution presented herein provides for an efficient particle removal from ready-to-fill packages or blanks 2 at a comparatively low consumption of pressurized air. In particular, the presented solution is considerably very efficient in removing, not only the larger particles but also smaller particles (down to 0.1 mm diameter). As the particle removal device 18 is separated from the package disinfection station 20 it allows for creating optimal conditions for particle removal without the limitations of the requirements for the package disinfection process and the requirements of maintaining hygienic conditions in the hygienic zone.

The particle removal device 18 is a space-efficient solution as only one package position is required, still processing both packages in an indexing pair. This space efficient solution enables implementation downstream the ultrasonic sealing of cap, thus allowing for targeting also the micron-sized particles generated during the ultrasonic cap sealing process. Those small particles still being present in the bulk of the package are preferably captured before they are stuck to the packaging material, due to e.g. the strength of the electrostatic forces and van der Waals bonds between the particles and the walls of the package. The solution presented herein allows for early processing the package flushing out a significant part of the small particles before they are stuck onto the walls.

Another benefit of implementation of the particle removal device 18 before the package disinfection station 20 is that the particle removal function will be independent of the processes of package disinfection and maintenance of hygienic chamber conditions respectively, whereby efficient particle removal can be obtained without jeopardizing these critical functions. The particle removal device 18 can thereby be operated without increasing the risk of re-contamination of the package after or at the end of the disinfection process thereby reducing the risk of re-contamination of the package after disinfection. It also enables optimization of the package disinfection process without risking the particle removal function.

Figure 6:
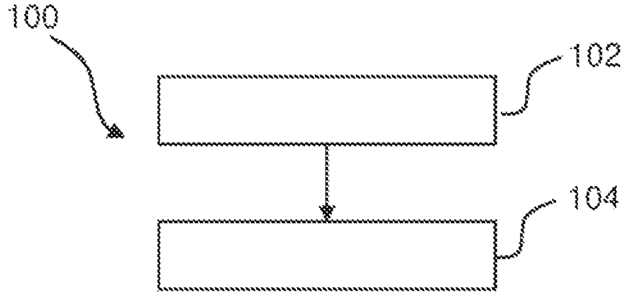
FIG. 6 is a schematic view of a method according to an embodiment.

Now turning to FIG. 6, a method 100 is schematically shown. The method 100 is performed at a filling machine configured to form, fill, and seal individual packages. The method 100 comprises a step 102 of providing a particle removal device 18 in accordance with the description above, and a step 104 of activating said particle removal device such that a jet of air is directed into a ready-to-fill package passing the particle removal device.

From the description above follows that, although various embodiments of the invention have been described and shown, the invention is not restricted thereto, but may also be embodied in other ways within the scope of the subject-matter defined in the following claims.

The invention claimed is:

1. A particle removal device for a filling machine configured to form ready-to-fill packages, to fill the ready-to-fill packages, and to seal the filled packages into individual packages, the particle removal device comprising:

an air supply pipe positioned to direct a jet of air into the ready-to-fill packages by way of an orifice of the air supply pipe as the ready-to-fill packages pass the orifice while moving in a moving direction, a controller configured to control air to the orifice of the air supply pipe so that upon starting activation of particle removal a jet of air is directed through the orifice and successively into first and second ones of the ready-to-fill packages that constitute an indexed pair of the ready-to-fill packages and so that upon ending the activation of particle removal the jet of air directed through the orifice stops, the controller being configured to: i) start the activation of the particle removal when a leading package edge of the first ready-to-fill package moving in the moving direction ahead of the second ready-to-fill package is positioned in the same vertical plane as the orifice of the air supply pipe; and ii) ending the activation of the particle removal after the second ready-to-fill package has passed the orifice of the air supply pipe.

2. The particle removal device according to claim 1, wherein the jet of air is constant during the activation.

3. The particle removal device according to claim 1, further comprising a hood, and wherein the air supply pipe is arranged inside said hood.

4. The particle removal device according to claim 3, wherein the hood is provided with an air evacuation unit.

5. The particle removal device according to claim 3, wherein an orifice of the air supply pipe is arranged vertically below the bottom end of the hood.

6. The particle removal device according to claim 3, wherein the hood is dimensioned to cover at least one ready-to-fill package.

7. A filling machine, comprising a particle removal device according to claim 1.

8. The filling machine according to claim 7, further comprising a cap applicator station, and wherein the particle removal device is arranged downstream the cap applicator station.

9. The filling machine according to claim 7, further comprising a disinfection station, and wherein the particle removal device is arranged upstream the disinfection station.

10. The particle removal device according to claim 1, further comprising a valve connected to the air supply pipe, the controller being operatively connected to the valve to control air to the orifice of the air supply pipe.

11. A method for a filling machine configured to form ready-to-fill packages, to fill the ready-to-fill packages, and to seal the filled packages into individual packages, the method comprising:

moving a pair of the ready-to-fill packages in a moving direction toward an air supply pipe so that a first ready-to-fill package of the pair is positioned in advance of a second ready-to-fill package of the pair;

starting activation of particle removal to direct a jet of air through the air supply pipe, the jet of air directed through the air supply pipe being directed successively into the first ready-to-fill package and then into the second ready-to-fill package;

the starting of the activation of particle removal to direct the jet of air through the air supply pipe occurring when a leading package edge of the first ready-to-fill package moving in the moving direction is positioned in the same vertical plane as the air supply pipe; and ending the activation of the particle removal after the second ready-to-fill package has passed the air supply pipe, the ending of the activation of the particle removal stopping the jet of air directed through the air supply pipe.

12. The method according to claim 11, wherein the jet of air is constant from the starting of the activation of particle removal to the ending of the activation of the particle removal.

13. The method according to claim 11, wherein the air supply pipe is positioned in a hood, and further comprising evacuating air out through the hood while the jet of air is being directed through the air supply pipe.

14. A machine for advancing blanks in a moving direction to produce filled packages, the machine comprising:

a bottom sealing station at which bottoms of the blanks are sealed to result in ready-to-fill packages;

a particle removal station at which particles are removed from the ready-to-fill packages, the particle removal station being located downstream of the bottom sealing station in the moving direction;

a filling station at which the ready-to-fill packages are filled with contents, the filling station being located downstream of the particle removal station in the moving direction;

the particle removal station comprising:

an air supply pipe positioned to direct a jet of air into the ready-to-fill packages as the ready-to-fill packages pass the air supply pipe while moving in the moving direction, a controller configured to control air to the air supply pipe based on a position of the ready-to-fill packages relative to the air supply pipe.

15. The machine according to claim 14, further comprising a disinfection station at which an amount of living micro-organisms in the ready-to-fill packages is reduced, the disinfection station being located downstream of the particle removal station and upstream of the filling station relative to the moving direction.

16. The machine according to claim 14, wherein the controller is configured to: i) start activation of the particle removal, by which the jet of air is directed through the air supply pipe and successively into first and second ones of the ready-to-fill packages, when a leading package edge of the first ready-to-fill package moving in the moving direction ahead of the second ready-to-fill package is positioned in the same vertical plane as an orifice of the air supply pipe; and ii) end the activation of the particle removal, by which the jet of air directed through the air supply pipe stops, when the second ready-to-fill package has passed the orifice of the air supply pipe.

17. The machine according to claim 14, further comprising a valve connected to the air supply pipe, the controller being operatively connected to the valve to control the air to the air supply pipe.

* * * * *